United States Patent
Ibrahim et al.

(10) Patent No.: US 12,509,348 B1
(45) Date of Patent: Dec. 30, 2025

(54) METHOD OF PRODUCING HYDROGEN GAS FROM SODIUM BOROHYDRIDE

(71) Applicant: IMAM MOHAMMAD IBN SAUD ISLAMIC UNIVERSITY, Riyadh (SA)

(72) Inventors: Mohamed Nady Abd El-Hameed Ibrahim, Riyadh (SA); Laila Saad Saeed Alqarni, Riyadh (SA); Maha Daifullah Mohammed Alghamdi, Al Bahah (SA); Reem Daifullah Mohammed Alghamdi, Al Bahah (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/236,538

(22) Filed: Jun. 12, 2025

(51) Int. Cl.
| | |
|---|---|
| *C01B 3/04* | (2006.01) |
| *B01J 21/10* | (2006.01) |
| *B01J 23/34* | (2006.01) |
| *B01J 35/45* | (2024.01) |
| *B01J 35/55* | (2024.01) |

(52) U.S. Cl.
CPC ............... *C01B 3/04* (2013.01); *B01J 21/10* (2013.01); *B01J 23/34* (2013.01); *B01J 35/45* (2024.01); *B01J 35/55* (2024.01); *C01B 2203/0277* (2013.01)

(58) Field of Classification Search
CPC .... C01B 3/04; C01B 2203/0277; B01J 21/10; B01J 23/34; B01J 35/45; B01J 35/55
See application file for complete search history.

(56) References Cited

FOREIGN PATENT DOCUMENTS

| CN | 102275903 B | 8/2015 |
|---|---|---|
| KR | 10-2012-0070309 A | 6/2012 |

OTHER PUBLICATIONS

English machine translation of CN102275903B (Year: 2015).*
Alshammari et al., "A High-Performance Cr2O3/CaCO3 Nanocomposite Catalyst for Rapid Hydrogen Generation from NaBH4" Nanomaterials 14, Feb. 2024, 1-18 (Year: 2024).*
Alshammari et al., "Direct synthesis of sodium doped Cu2O/GO nanocomposites for catalytic hydrogen production from NaBH4" Diamond & Related Materials 137, Jun. 2023, 1-8 (Year: 2023).*
Erat et al., "Co/CuO—NiO—Al2O3 catalyst for hydrogen generation from hydrolysis of NaBH4" International Journal of Hydrogen Energy 47, Jun. 2022, 24255-24267 (Year: 2022).*
Marzieh Joda, et al., "Optimization of electrodeposited manganese oxide nanostructures on graphite electrode for efficient direct electrooxidation of ammonia and hydrogen production", Nov. 20, 2023, pp. 1-38, 38 Pages.
A. Chakravarty, et al., "MnO2 Nanowires Anchored on Amine Functionalized Graphite Nanosheets: Highly Active and Reusable Catalyst for Organic Oxidation Reactions", RSC Advances, Issue 112, 2015, 14 Pages.
Benedette Cuffari, "Graphene-wrapped magnesium nanoparticles for hydrogen energy storage", Sep. 21, 2017, 5 Pages.

* cited by examiner

*Primary Examiner* — Anthony J Zimmer
*Assistant Examiner* — Abdul-Rahman Yusuf Waleed Smari
(74) *Attorney, Agent, or Firm* — Oblon, McClelland, Maier & Neustadt, L.L.P.

(57) ABSTRACT

A method of producing hydrogen gas comprising: hydrolyzing sodium borohydride ($NaBH_4$) with water at a temperature of from 20 to 75° C. in the presence of a nanocomposite catalyst. The method is characterized in that the ratio by weight of sodium borohydride to the nanocomposite catalyst is from 1:1 to 5:1. Further, the nanocomposite catalyst comprises graphite sheet particles on which are disposed nanorods of $\delta$-$MnO_2$ and nanoparticles of MgO.

19 Claims, 7 Drawing Sheets

METHOD OF PRODUCING HYDROGEN GAS FROM SODIUM BOROHYDRIDE

BACKGROUND

Technical Field

The present disclosure is directed to a method of producing hydrogen gas and, more particularly, relates to a nanocomposite catalyst used in the hydrolysis of sodium borohydride ($NaBH_4$) with water to generate hydrogen gas as a fuel.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The tremendous industrialization and population increase in recent years have led to a search for alternate energy sources to meet the expanding energy demand. Primarily, the depletion of non-renewable energy resources and environmental concerns are compelling societies to switch to clean, renewable energy sources. On account of its high energy density (120 megajoules per kilograms (MJ/kg)), non-toxicity, and ecological friendliness, hydrogen gas has emerged as an important energy carriers among renewable sources.

While solar energy generation is inexpensive, the storage of this energy incurs costs due to a reliance on batteries, which require frequent replacement and pose challenges in their safe disposal. Conversely, hydrogen energy provides numerous advantages over batteries in terms of energy conservation and powering diverse applications. A key benefit is that that hydrogen possesses a higher energy density than conventional batteries, allowing it to store greater energy in a less volume: this renders hydrogen optimal for applications such as transportation, where weight and space are paramount. Refueling a hydrogen vehicle requires only a few minutes, akin to conventional gasoline automobiles, whereas charging batteries can be far more time-consuming. Hydrogen fuel cells, for instance, offer extended ranges relative to battery electric vehicles, rendering fuel-cell powdered vehicles appropriate for heavy-duty applications and long-distance journeys. In larger-scale vehicular applications, such as trucks or ships, hydrogen fuel cells may be lighter than comparable battery systems, which is essential for efficiency and payload capacity. Moreover, in contrast to batteries, which deteriorate over time and necessitate replacement, hydrogen systems can sustain performance for an extended duration with adequate maintenance. Hydrogen production can be amplified from renewable sources, potentially resulting in sustainable and extensive energy storage options: the generation of hydrogen through electrolysis utilizing solar or wind energy is an important example. Hydrogen derived from renewable sources furthermore provides a clean energy alternative, generating solely water vapor when utilized in fuel cells.

Hydrogen is applicable in other areas outside transportation, including industrial operations, heating, and energy storage, hence offering variety in energy solutions. Hydrogen can retain surplus renewable energy for extended durations, assisting in the equilibrium of supply and demand within the energy system. Hydrogen can stabilize the electrical grid by serving as a versatile energy storage solution, absorbing surplus energy during peak production periods.

Despite its inherent advantages, the difficulties in safely storing and transporting hydrogen have stymied its widespread utilization.

Hydrogen is typically stored either: under compression; as a liquid under deep refrigeration; through being chemically bound within a metal hydride; or, through being chemically bound within other compounds. Sodium borohydride ($NaBH_4$) has become an important compound for hydrogen storage given its stability, non-flammability and non-toxicity: $NaBH_4$ further contains two moles of hydrogen ($H_2$) and that hydrogen constitutes 10.8 wt. % of the compound.

When required, hydrogen is released from $NaBH_4$ by hydrolysis:

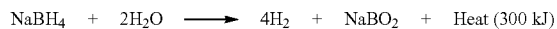

$$NaBH_4 + 2H_2O \longrightarrow 4H_2 + NaBO_2 + \text{Heat (300 kJ)}$$

According to this reaction, the hydrolysis releases the 2 moles of hydrogen bound within the $NaBH_4$, as well as hydrogen bound within the reactant water.

$NaBH_4$ may undergo self-hydrolysis but this occurs at a very slow reaction rate. Consequently, either heterogeneous or homogeneous catalysts are employed to drive the hydrolysis reaction at viable temperatures, such as temperatures close to room temperature. Heterogeneous catalysts are preferred in this context on the basis that they: typically possess longer functional lifetimes; can be facilely separated from the sodium metaborate ($NaBO_2$) solution formed as a co-product of the hydrolysis reaction; and, are not associated with the formation of gaseous side products, such as diborane.

Active heterogeneous catalysts for the hydrolysis process of sodium borohydride have predominantly been based on noble metals, such as Pt, Ru and Pd. [See: *Huff C, Long JM, Heyman A, Abdel-Fattah TM* (2018) *ACS Appl Energy Mater* 1:4635-4640; Brack P, Dann SE, Wijayantha KGU (2015) *Energy Sci Eng* 3:174-188; Wei L, Ma M, Wang D, Wang Q, Lu Y, Zhang S (2018) *Funct. Mater. Lett.* 11:1850079.] However such noble metals are associated with high costs, low abundance and toxicity [See Bullock RM (2017) *Chemistry* 2:444-446].

Accordingly, one objective of the present disclosure is to provide an alternative heterogeneous catalyst which demonstrates activity and efficiency in hydrogen production via hydrolysis of sodium borohydride ($NaBH_4$) and which can circumvent the aforementioned drawbacks of existing catalysts.

SUMMARY

In an exemplary embodiment, a method of producing hydrogen gas includes hydrolyzing sodium borohydride ($NaBH_4$) with water at a temperature of from about 20 to about 75° C. in the presence of a nanocomposite catalyst. The ratio by weight of $NaBH_4$ to the nanocomposite catalyst is from about 1:1 to about 5:1. The nanocomposite catalyst comprises graphite sheet particles on which are disposed: nanorods of δ-manganese (IV) oxide (δ-$MnO_2$); and, nanoparticles of magnesium oxide (MgO).

In some embodiments, the nanocomposite catalyst comprises: from about 50 to about 90 wt. % of the graphite sheet particles; from about 5 to about 20 wt. % of the nanorods of δ-$MnO_2$; and, from about 0.5 to about 5 wt. % of the nanoparticles of MgO. The wt. % is based on the total weight of the nanocomposite catalyst.

In some embodiments, the nanocomposite catalyst comprises, based on the total weight of the nanocomposite catalyst: from about 70 to about 90 wt. % of graphite; from about 5 to about 15 wt. % of the nanorods of δ-$MnO_2$; and, from about 1 to about 3 wt. % of the nanoparticles of MgO.

In some embodiments, the ratio by weight of δ-$MnO_2$ to MgO in the nanocomposite catalyst is from about 20:1 to about 5:1.

In some embodiments, the ratio by weight of δ-$MnO_2$ to MgO in the nanocomposite catalyst is from about 12:1 to about 8:1.

In some embodiments, the MgO is in the cubic crystalline phase.

In another exemplary embodiment, there is provided a method of preparing the nanocomposite catalyst, the method comprising: ultrasonicating an acidified aqueous dispersion of δ-$MnO_2$ nanorods and MgO nanoparticles, in which aqueous dispersion a graphite sheet has been at least partially immersed; and, separating and drying the graphite sheet obtained after ultrasonicating the acidified aqueous dispersion of δ-$MnO_2$ nanorods and MgO nanoparticles.

In some embodiments, the acidified aqueous dispersion comprises a mineral acid selected from the group consisting of sulphuric acid ($H_2SO_4$), hydrochloric acid (HCl), nitric acid ($HNO_3$) and phosphoric acid ($H_3PO_4$).

In some embodiments, the acidified aqueous dispersion comprises HCl.

In yet another exemplary embodiment, the δ-$MnO_2$ nanorods are obtained by: adding a polyol reductant to an aqueous solution of an Mn(VII) salt to form a gelled precipitate of $MnO_2$; separating the precipitate by centrifugation; and, drying the separated precipitate at a temperature of from about 60 to about 100° C.

In some embodiments, the polyol reductant comprises or consists of glycerol.

In some embodiments, the Mn(VII) salt is selected from the group consisting of sodium permanganate ($NaMnO_4$), potassium permanganate ($KMnO_4$) and ammonium permanganate (($NH_4$) $MnO_4$).

In some embodiments, the Mn(VII) salt is potassium permanganate ($KMnO_4$).

In yet another exemplary embodiment, the MgO nanoparticles are obtained by: precipitating magnesium hydroxide by adding an alkali metal hydroxide to an aqueous solution of magnesium salt; separating the precipitate by centrifugation; drying the separated precipitate at a temperature of from about 60 to about 100° C.; and, heating the dried precipitate in the air at a temperature of from about 300 to about 600° C.

In some embodiments, the ratio by weight of $NaBH_4$ to the nanocomposite catalyst is from about 1:1 to about 3:1.

In some embodiments, the $NaBH_4$ is hydrolyzed with water at a temperature of from about 30 to about 75° C.

In some embodiments, the $NaBH_4$ is hydrolyzed with water at a temperature of from about 35 to about 60° C.

In some embodiments, the method has a hydrogen generation rate of from about 100 to 2000 milliliters per minute per gram (mL $min^{-1}$ $g^{-1}$), based on the weight of the $NaBH_4$.

In some embodiments, the method has a hydrogen generation rate of from about 500 to about 2000 mL $min^{-1}$ $g^{-1}$, based on the weight of the $NaBH_4$.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
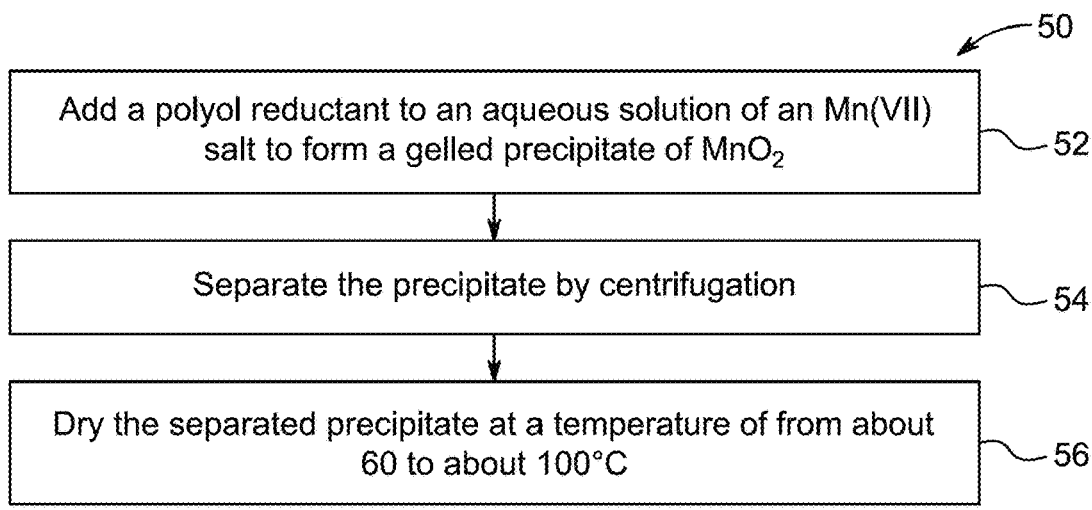
FIG. 1A is a schematic flowchart of a method of preparing δ-manganese (IV) oxide ($MnO_2$) nanorods, according to certain embodiments.

Embodiments of the present invention will now be described more fully hereinafter with reference to the accompanying drawings wherever applicable, in that some, but not all, embodiments of the disclosure are shown.

When describing the present disclosure, the terms used are to be construed in accordance with the following definitions, unless a context dictates otherwise.

As used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

As used herein, the term 'room temperature' refers to a temperature range of 23 degrees Celsius (° C.)+2° C. in the present disclosure. As used herein, 'ambient conditions' means the temperature and pressure of the surroundings in which the substance, composition or article is located.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., or 1° C.

As used herein, the term 'fraction' refers to a numerical quantity which defines a part up to, but not including, 100 percent or the entirety of the thing in question.

As used herein the term 'disposed' refers to being positioned, placed, deposited, arranged or distributed in a particular manner.

As used herein, the term 'X-ray diffraction' or 'XRD' or 'X-ray crystallography' refers to basic technique for obtaining information on the atomic structure of crystalline materials used as a standard laboratory technique. Unless otherwise specified, the XRD shall include an analytical technique based on the diffraction of X-rays by matter, especially for crystalline materials.

A cubic crystalline phase refers to a crystal structure where the unit cell is shaped like a cube, with three equal-length axes that are perpendicular to each other (at 90° angles). In this crystal system, the atoms or ions are arranged in a repeating pattern within the cubic lattice. The cubic crystalline structure is highly symmetric, possessing four threefold rotational axes and three fourfold rotational axes, permitting rotations of 90° around its specific axes and rotations of 120° about the body diagonals of the cube, while maintaining the same structure.

As used herein, the term 'particle' refers to a small object that acts as a whole unit with regard to its transport and properties. As used herein, 'nanoparticles'-sometimes contracted herein to NPs-refers to particles having a particle size of 1 nanometer (nm) to 1000 nm. Unless a specific (nano) particle morphology is identified for a compound herein, it is envisaged that (nano) particles that are fibrous, acicular, spherical, ellipsoidal, cylindrical, bead-like, cubic or platelet-like may be present alone or in combination. Moreover, it is envisaged that agglomerates of (nano) particles having the same or different morphologies may be present in the composite.

As used herein, the term "nanorod" refers to a nanoparticle having a substantially cylindrical shape.

Unless otherwise stated, the term 'particle size' refers to the largest axis of the particle. In the case of a generally spherical particle, the largest axis is the diameter.

The term 'median volume particle size' (Dv50), as used herein, refers to a particle size corresponding to 50% of the volume of the sampled particles being greater than and 50% of the volume of the sampled particles being smaller than the recited Dv50 value. Similarly, if used, the term 'Dv90' refers to a particle size corresponding to 90% of the volume of the sampled particles being smaller than and 10% of the volume of the sampled particles being greater than the recited Dv90 value. Particle size is determined herein by Scanning Electron Microscopy (SEM).

As used herein, the term 'nanocomposite' refers to a composite material in which at least one dimension of a component thereof is in the nanometer size scale (<100 nm). The nanocomposites are thus poly-phase solid materials made up of two or more nanomaterials. The term includes all types of multiphase solid material in which one of the phases has one, two, or three dimensions of less than 100 nm, or structures having nanoscale repeat distances between the different phases that make up the material.

The term "powder", as used herein, means a composition that consists of finely dispersed solid particles that are free-flowing.

The term "dry" as used herein means comprising less than 5 wt. % of any compound or composition being in liquid form when measured at 25° C. under ambient conditions. For instance, the term "dry" includes comprising less than 3 wt. %, less than 2 wt. %, less than 1%, or even about 0% of said compound or composition being in liquid form when measured at 25° C. under ambient conditions. Exemplary such compounds or compositions include water, oils, organic solvents and other wetting agents.

As used herein, the term number average molecular weight (Mn) and weight average molecular weight (Mw) are determined by gel permeation chromatography (GPC) with tetrahydrofuran (THF) as the eluent in accordance with DIN 55672-1:2007-08.

The term "polar solvent" as used herein refers to a solvent having a dielectric constant ($\varepsilon$) of more than 5 as measured at 25° C. The determination of dielectric constant (E) is known in the art: the use of measured voltages across parallel plate capacitors in such determinations may be mentioned. The term "polar solvent" may encompass both aprotic and protic solvents, wherein protic solvents are those solvents which are capable of yielding or accepting a proton and aprotic solvents are those solvents that do not yield or accept a proton.

Water, for use as a (co-) solvent or diluent herein, is intended to mean water of low solids content as would be understood by a person of ordinary skill in the art. The water may, for instance, be distilled water, demineralized water, deionized water, reverse osmosis water, boiler condensate water, or ultra-filtration water. Tap water may be tolerated in certain circumstances.

As used herein, "polyol" refers to any compound comprising two or more hydroxyl groups: the term is thus intended to encompass diols, triols and compounds containing four or more-OH groups.

The term 'hydroxyl number' as used herein is defined as the mass in milligrams of potassium hydroxide required to neutralize the acetic acid taken up on acetylation of one gram of a chemical substance that contains free hydroxyl groups. Where stated, the hydroxyl number is determined in accordance with ASTM D4274-11.

As used herein, the term "ultrasonication" refers to irradiation with ultrasonic waves having a frequency of at least 20 KHz. Without intention to limit the present disclosure, ultrasonication may be performed using an ultrasonic bath or an ultrasonic probe.

The term 'dropwise' as used herein means that one discrete drop or aliquot of a liquid, irrespective of its size or volume, is administered at a time. Discrete drops or aliquots are administered consecutively: they may be provided at regular intervals, at irregular intervals or both such intervals may be applied over the course of administration of the liquid. Further, the volume of an aliquot or drop may be independently determined and thus may be varied over the course of administration of the liquid. Exemplary devices for dropwise addition of liquids include syringes and columns.

As used herein, the term 'sol-gel method' refers to the synthetic process used to produce metal oxide and composite materials by forming a sol through the polymerization of metal salts in a solvent, typically but not necessarily with the help of a chelating agent. The sol is then converted into a gel by the addition of a gelling agent, and, upon heating, the gel undergoes a transformation into a solid metal oxide or composite material.

As used herein, the term 'gel' refers to a viscoelastic or semi-solid phase that may form when a sol undergoes a transition to a more structured, three-dimensional network. This transition may occur through polymerization or cross-linking, typically facilitated by the addition of a gelling agent or by partial evaporation of the liquid medium of the sol. The result is a gel in which the liquid phase is entrapped within a solid network, creating a material that is free-standing or self-supporting—in that its yield value is greater than the sheer stress imposed by gravity—but which is still composed of a significant amount of liquid.

The term 'carbonization' as used herein refers to a thermally actuated process which transforms a carbon containing substrate to a product having an increased proportion of elemental carbon. In the present disclosure, the atmosphere of carbonization may either comprise oxygen or be oxygen free. The former alternative includes atmospheres in which the supply of oxygen is restricted. The latter alternative includes the performance of carbonization under vacuum or under an inert atmosphere, of which nitrogen and argon atmospheres may be mentioned as examples.

As used herein, the term 'calcination' refers to a thermal treatment process which is conducted in the absence of, or under a restricted supply of ambient oxygen. This is performed to remove impurities or volatile substances and/or to induce thermal decomposition or a change in the thermally treated material.

As used herein, 'comminuting' refers to process of reducing the average size of solid materials into smaller particles, by crushing, grinding, cutting, vibrating, or other processes.

Hydrolysis, as used herein, is the chemical reaction of a molecule with water to produce two or more smaller molecules.

As used herein, 'hydrogen generation rate' (HGR) refers to the amount of hydrogen gas produced per unit of time during a chemical reaction.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of the present disclosure are directed toward a MgO—MnO$_2$@ Graphite sheets (graphite flexes, GF) nanocomposite designed to function as a catalyst in the hydrolysis of sodium borohydride (NaBH$_4$) with water to form hydrogen gas. The nanocomposite catalyst facilitates the safe and rapid release of hydrogen from NaBH$_4$, making it an efficient solution for clean hydrogen production. The present disclosure circumvents the drawbacks of prior art by addressing key limitations such as high catalyst cost, slow reaction rate, and environmental concerns. Traditional catalysts often include expensive materials, or result in inefficient or slow hydrogen production. In contrast, the present disclosure uses a cost-effective catalyst that promotes faster hydrogen generation without relying on toxic or scarce materials. The simplicity of the preparation of the present nanocomposite and its high catalytic activity also ensures scalability and practical applicability, making it a more efficient and sustainable alternative to existing methods.

A nanocomposite catalyst is described. The nanocomposite catalyst includes a MgO—MnO$_2$@GF catalyst, which comprises or consists of magnesium oxide (MgO) nanoparticles (NPs) decorated with manganese oxide (MnO$_2$) nanorods and which are disposed upon graphite sheets (GF).

In some embodiments, the nanocomposite catalyst comprises, based on the total weight of the nanocomposite catalyst from about 50 to about 90 wt. %, for example from about 55 to about 85 wt. %, from about 60 to about 80 wt. %, from about 65 to about 75 wt. % or from about 70 to about 75 wt. % of graphite.

In some embodiments, the nanocomposite catalyst comprises, based on the total weight of the nanocomposite catalyst from about 5 to about 20 wt. %, for example from about 6 to about 19 wt. %, from about 7 to about 18 wt. %, from about 9 to about 17 wt. %, from about 10 to about 15 wt. % or from about 12 to about 14 wt. % of the nanorods of δ-MnO$_2$.

In some embodiments, the nanocomposite catalyst comprises, based on the total weight of the nanocomposite catalyst, from about 0.5 to 5 wt. %, for example from about 1 to about 4.5 wt. %, from about 1.5 to about 4 wt. %, from about 2 to about 3.5 wt. %, or from about 2.5 to about 3 wt. % of the NPs of MgO.

In some embodiments, the nanocomposite catalyst comprises, based on the total weight of the nanocomposite catalyst: from about 70 to about 90 wt. %, for example from about 71 to about 89 wt. %, from about 72 to about 88 wt. %, from about 74 to about 86 wt. %, from about 76 to about 84 wt. %, or from about 78 to about 82 wt. % of graphite; from about 5 to about 15 wt. %, for example from about 6 to about 14 wt. %, from about 8 to about 12 wt. % or from about 10 to about 11 wt. % of the nanorods of δ-MnO$_2$; and, from about 1 to about 3 wt. %, for example from about 1.5 to about 2.5 wt. %, for example from about 2 to about 2.5 wt. % of the NPs of MgO.

In some embodiments, the ratio by weight of δ-MnO$_2$ to MgO in the nanocomposite catalyst is from about 20:1 to about 5:1, for example from about 19:1 to about 6:1, from about 18:1 to about 7:1, from about 15:1 to about 8:1, or from about 12:1 to about 8:1.

In some embodiments, the MgO may exist in different phases, depending on the processing conditions, temperature, and pressure. In some embodiments, MgO may be present in the cubic, hexagonal, monoclinic, and amorphous phases. In a preferred embodiment, at least a fraction of the MgO is in the cubic crystalline phase. For example, at least 80 wt. % or at least 90 wt. % of the MgO is in the cubic crystalline phase.

FIG. 1A illustrates a schematic flow chart of a method 50 of preparing the δ-$MnO_2$ nanorods. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, method 50 includes adding a polyol reductant to an aqueous solution of an Mn(VII) salt to form a gelled precipitate of $MnO_2$. For this purpose, initially, an Mn(VII) salt is added to the aqueous solution. The aqueous solution includes a solvent in which water is the primary medium for dissolution of other substances. Water is considered a polar solvent, enabling it to dissolve various ionic and polar compounds. Water, as used herein, may be tap water, distilled water, double-distilled water, deionized water, deionized distilled water, reverse osmosis water, and/or some other water. In a preferred embodiment, the water is distilled water.

Suitable examples of the Mn(VII) salt include, but are not limited to, sodium permanganate ($NaMnO_4$), potassium permanganate ($KMnO_4$), and ammonium permanganate (($NH_4$) $MnO_4$). In a preferred embodiment, the Mn(VII) salt is potassium permanganate ($KMnO_4$). The concentration of the solution will depend on the desired amount of manganese dioxide ($MnO_2$) to be produced. In a preferred embodiment, the concentration of the Mn(VII) salt in the aqueous solution is in the range of from about 0.1 to about 0.5 M, preferably from about 0.2 to about 0.4 M, or about 0.3 M.

The polyol reductant is added—preferably in a dropwise manner—to the aqueous solution of an Mn(VII) salt. The polyol acts as a reducing agent, reducing Mn(VII) to Mn(IV), resulting in the formation of $MnO_2$ (manganese dioxide).

In certain embodiments, the polyol reductant comprises or consists of at least one diol. Exemplary diols may be saturated or unsaturated and may be aliphatic, cycloaliphatic or aromatic dihydroxy compounds. The diols may typically have a molecular weight of 250 g/mol. or less. When used herein, the term "diol" can include equivalent ester forming derivatives thereof, provided, however, that the molecular weight requirement pertains to the diol only and not to its derivative. Exemplary ester forming derivatives include the acetates of the diols as well as, for example, ethylene oxide or ethylene carbonate for ethylene glycol.

Typical diols having utility herein are those having from 2 to 20 carbon atoms. Examples of these diols include: ethane-1,2-diol (ethylene glycol); propane-1,2-diol (propylene glycol); 1,3-propane diol; 1,2-butane diol; 2-methyl propanediol; 1,3-butane diol; 1,4-butane diol; 2,3-butanediol; neopentyl glycol; hexanediol; decanediol; hexamethylene glycol; cyclohexane dimethanol; polyoxalkylene glycols, such as diethylene glycol, dipropylene glycol, triethylene glycol, tetraethylene glycol, tripropylene glycol and tetrapropylene glycol; and, aromatic diols, such as bisphenol A, bisphenol F, hydrogenated bisphenol A and hydrogenated bisphenol F. Mixtures of such diols may be employed.

In certain embodiments, the polyol reductant comprises or consists of at least one polyol having 3 hydroxyl groups. Suitable polyols having from 3 hydroxyl groups may be saturated or unsaturated and may be aliphatic, cycloaliphatic or aromatic compounds: the compounds can typically have a molecular weight of 400 g/mol. or less. Non-limiting examples of aliphatic triols include: 1,2,3-propanetriol (glycerol); 1,2,4-butanetriol; 2-ethyl-2-hydroxymethyl-1,3-propanediol (trimethylolpropane); 3-methyl-1,3,5-pentanetriol; 1,2,3-hexanetriol; 1,2,6-hexanetriol; 2,5-dimethyl-1,2,6-hexanetriol; 1,2,3-heptanetriol; 1,2,3-octanetriol; and, 2-hydroxymethyl-1,3-propanediol.

It is not precluded that the polyol reductant may comprise or consist of at least one polyol having from 4 to 6 hydroxyl groups. Suitable polyols having from 4 to 6 hydroxyl groups may be saturated or unsaturated and may be aliphatic, cycloaliphatic or aromatic compounds: the compounds can typically have a molecular weight of 400 g/mol. or less. Non-limiting examples of aliphatic tetrols and aliphatic pentols include: 2,2-bis(hydroxymethyl) propane-1,3-diol (pentaerythritol); pentose; pentopyranose; 6-deoxyhexopyranose; 2,5-anhydrohexitol; 1,5-anhydrohexitol; 6-deoxyhexose; 1-deoxyhexitol; and, pentitol. An exemplary polyol having six hydroxyl groups is D-glucitol (sorbitol). In embodiments, 2-ethyl-2-hydroxymethyl-1,3-propanediol (trimethylolpropane), 2,2-bis(hydroxymethyl) propane-1,3-diol (pentaerythritol) or mixtures thereof may be used.

For surety, the present disclosure does not preclude the use—as the polyol reductant having from 3 to 6 hydroxyl groups—of ($C_2$-$C_4$) alkylene oxide adducts of the aforementioned diols, triols and higher polyols.

In an embodiment, the polyol reductant comprises propane-1,2,3-triol, ethane-1,2-diol or mixtures thereof.

The pH of the aqueous solution may, in certain circumstances, be adjusted prior to, simultaneously with or subsequent to the addition of the polyol reductant thereto. Mn(VII) salts tend to be more stable under acidic conditions: it may therefore be beneficial for the polyol reductant to act under more neutral or mildly acidic conditions. For instance, the pH of the aqueous solution may be adjusted to the range of from about 4 to about 8.

It is preferred that the aqueous solution is stirred whilst and after adding the polyol, allowing the Mn(VII) to reduce to $MnO_2$. The reduction leads to the formation of a gelled precipitate of $MnO_2$. In an embodiment, the aqueous solution is stirred for a duration of from about 18 to about 30 hours, for example from about 20 to about 28 hours, from about 22 to about 26 hours, or about 24 hours.

At step 54, the method 50 includes separating the precipitate of $MnO_2$ by centrifugation. Further separation methods may also be employed in addition to or as an alternative to centrifugation: mention may be made of filtration, decantation, evaporation, and solvent extraction.

At step 56, the method 50 includes drying the separated precipitate at a temperature of from about 60 to about 100° C., for example from about 65 to about 95° C., from about 70 to about 90° C. or from about 75 to about 85° C. Such drying may be carried out using known heating methods, such as a vacuum oven, rotary evaporator, microwave-assisted drying process, freeze-drying, and infrared drying. In a preferred embodiment, the precipitates are dried at a temperature of about 80° C. in a hot air electric oven.

The product of the drying step 56 of method 50 may retain some carbonaceous residue derived from the polyol reductant. Such polyol reductant may not be completely separated from the MnO$_2$ in the separation step 54 and, further, at the temperatures employed in the drying step 56, only limited carbonization or thermal decomposition of that residual polyol reductant may occur. It is thus not precluded that the MnO$_2$ obtained in the above described method may comprise carbonaceous residues in an amount up to about 5 wt. %, based on the weight of said MnO$_2$. For example, the MnO$_2$ may comprise carbonaceous residues in an amount up to about 1 wt. % or up to about 0.5 wt. %, based on the weight of said MnO$_2$.

The MnO$_2$ prepared according the method 50 has, as determinable by X-Ray Diffraction (XRD), a δ-MnO$_2$ (birnessite) crystalline configuration. Such δ-MnO$_2$ provides XRD peaks at 12.2°, 26.5°, and 36.6°, corresponding respectively to the (001), (002), and (−111) crystal planes, thereby enabling it to be distinguished from a-MnO$_2$ and γ-MnO$_2$.

At least fraction, for example at least about 60% or at least about 70% of the δ-MnO$_2$ has a nanorod morphology. In some such embodiments, the δ-MnO$_2$ nanorods have, as determined by Scanning Electron Microscopy: a median length of from about 1 to about 100 nanometers, for example from about 10 to about 90 nm, from about 20 to about 80 nm, from about 30 to about 70 nm or from about 40 to about 60 nm; and, a median diameter of from about 1 to about 40 nm, for example from about 5 to about 30 nm or from about 5 to about 20 nm.

Figure 1B:
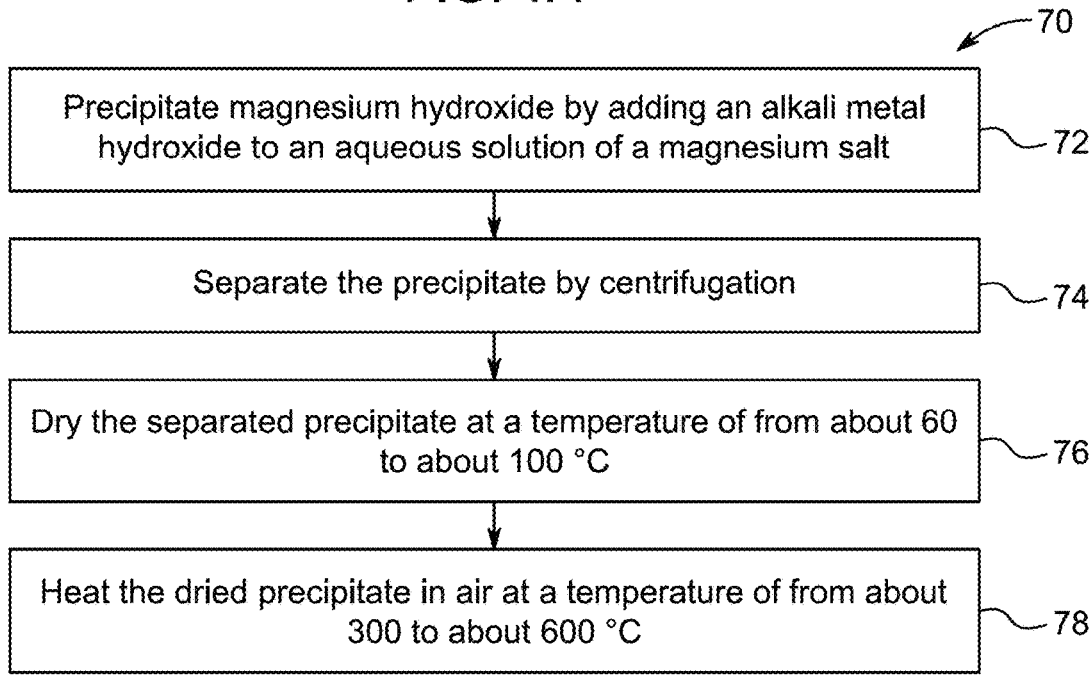
FIG. 1B is a schematic flowchart of a method of preparing magnesium oxide (MgO) nanoparticles (NPs), according to certain embodiments.

FIG. 1B illustrates a schematic flow chart of an exemplary method 70 of preparing the magnesium oxide (MgO) nanoparticles (NPs). The order in which the method 70 is described is not intended to be construed as a limitation, and any number of the described method steps can be combined to implement the method 70. Additionally, individual steps may be removed or skipped from the method 70 without departing from the spirit and scope of the present disclosure.

At step 72, the method 70 includes precipitating magnesium hydroxide by adding an alkali metal hydroxide to an aqueous solution of a magnesium salt. Exemplary magnesium salts which may be present in the aqueous solution either alone or in combination, include, but are not limited to: magnesium chloride; magnesium sulfate; magnesium carbonate; magnesium oxide; magnesium fluoride; magnesium bromide; magnesium iodide; magnesium hydroxide; magnesium citrate; magnesium malate; magnesium lactate; magnesium gluconate; magnesium ascorbate; magnesium tartrate; magnesium perchlorate; magnesium phosphate; magnesium stearate; magnesium pyrophosphate; magnesium silicate; magnesium borate; magnesium nitrate; magnesium formate; magnesium acetate; magnesium hypophosphite; magnesium tungstate; magnesium thiosulfate; magnesium nitride; magnesium aluminate; and, magnesium succinate. In a preferred embodiment, the magnesium salt is magnesium nitrate (Mg(NO$_3$)$_2$·6H$_2$O). In some embodiments, the molar concentration of the magnesium salt in the aqueous solution is from about 0.01 to about 1 M, for example about 0.05 to about 0.5 M, about 0.1 to about 0.3 M, from about 0.1 to about 0.2 M, or about 0.1 M.

In some embodiments, the alkali metal hydroxide-added at step 72 of the method 70—may include, but is not limited to: sodium hydroxide (NaOH); potassium hydroxide (KOH); lithium hydroxide (LiOH); and, cesium hydroxide (CsOH). In a preferred embodiment, the alkali metal hydroxide comprises or consists of sodium hydroxide (NaOH). In an embodiment, sodium hydroxide is added at step 72 in the form of an aqueous solution having a molar concentration of from about 0.1 to about 0.5 M, from about 0.2 to about 0.4 M, or about 0.2 M. Although this step 72 can be performed at room temperature, it is preferred that it is carried out at slightly elevated temperatures of from about 50 to about 70° C., such as from about 55 to about 65° C., or about 60° C.

At step 74, the method 70 includes separating the precipitate by centrifugation. Further separation methods may also be employed in addition to or as an alternative to centrifugation: mention may be made of filtration, decantation, evaporation, and solvent extraction.

At step 76, the method 70 includes drying the separated precipitate at a temperature of from about 60 to about 100° C., for example from about 65 to about 95° C., from about 70 to about 90° C. or from about 75 to about 85° C. In a preferred embodiment, the precipitates are dried at about 80° C.

At step 78, the method 70 includes heating the dried precipitate in air at a temperature of from about 300 to about 600° C., for example from about 310 to about 590° C., from about 330 to about 570° C., from about 350 to about 550° C., from about 370 to about 530° C. or from about 390 to about 510° C. Such heating may be performed for a duration of from about 1 to about 6 hours, for example from about 2 to about 6 hours or from about 2 to about 4 hours. In a preferred embodiment, the dried precipitate is heated in atmospheric air at about 400° C. for a duration of about 3 hours (h).

The heating of the precipitate is performed to induce the thermal decomposition of Mg(OH)$_2$ to MgO and H$_2$O; the heating may further serve to remove volatile substances and to induce thermal decomposition of carboniferous materials present.

Typically, the heating is carried out in a furnace equipped with a temperature control system, which may provide a heating rate of up to about 50° C. per minute (° C./min), for example up to about 40° C./min, up to about 30° C./min, up to about 20° C./min, up to about 10° C./min, up to about 5° C./min, up to about 2° C./min, or up to about 1° C./min.

It is not precluded in the present method, that the MgO nanoparticles directly obtained from the heating step may be subjected to at least one of comminution, homogenization or classification in order to moderate the particle size distribution thereof.

Figure 1C:
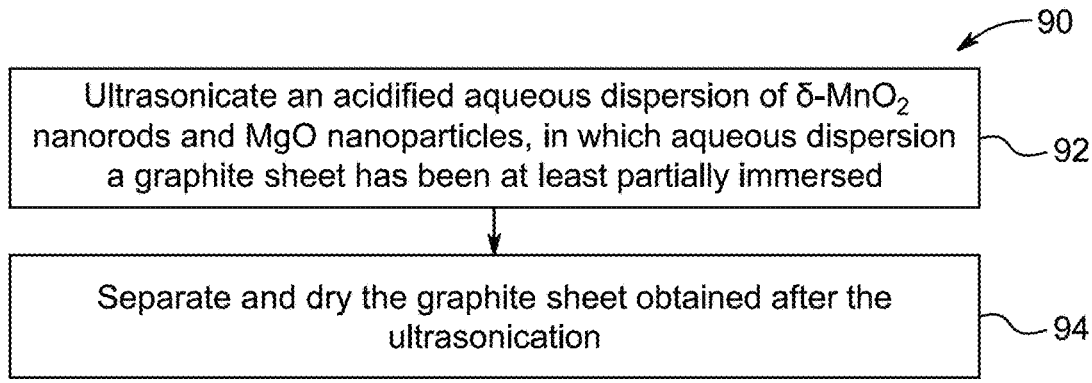
FIG. 1C is a schematic flowchart of a method of preparing a nanocomposite catalyst (MgO—$MnO_2$@graphite sheets (graphite flexes, GF)), according to certain embodiments.

FIG. 1C illustrates a schematic flow chart of a method 90 of preparing the MgO—MnO$_2$@ graphite sheet (graphite flex, GF) nanocomposite catalyst. The order in which the method 90 is described is not intended to be construed as a limitation, and any number of the described method steps can be combined to implement the method 90. Additionally, individual steps may be removed or skipped from the method 90 without departing from the spirit and scope of the present disclosure.

At step 92, the method 90 includes ultrasonicating an acidified aqueous dispersion of δ-MnO$_2$ nanorods and MgO nanoparticles (NPs), in which aqueous dispersion at least one graphite sheet has been at least partially immersed. In some embodiments, the ultrasonication is carried out for a duration of from about 10 to about 60 minutes, for example about 20 to about 50 minutes, about 30 to about 45 minutes, or about 30 minutes.

In some embodiments, the weight ratio of δ-MnO$_2$ nanorods to MgO NPs in the acidified aqueous dispersion is in the range of from about 20:1 to about 1:1, such as from about 18:1 to about 2:1, from about 16:1 to about 4:1, from about 15:1 to about 5:1, from about 14:1 to about 6:1, from about 13:1 to about 7:1, from about 12:1 to about 8:1, from about 11:1 to about 9:1, or about 10:1. In some embodiments, the weight ratio of graphite sheet to MgO NPs in the acidified aqueous dispersion is from about 10:1 to 60:1, for example about 20:1 to about 50:1, about 30:1 to about 45:1, from about 40:1 to about 45:1, or about 40:1. In some embodiments, the weight ratio of graphite sheet to δ-$MnO_2$ nanorods is from about 1:1 to about 10:1, such as from about 2:1 to about 9:1, from about 3:1 to about 8:1, from about 4:1 to about 6:1, or about 4:1.

In some embodiments, the acidified aqueous dispersion includes a mineral acid selected from the group consisting of sulphuric acid ($H_2SO_4$), hydrochloric acid (HCl), nitric acid ($HNO_3$), and phosphoric acid ($H_3PO_4$). In a preferred embodiment, the acidified aqueous dispersion includes HCl.

At step 94, method 90 includes separating and drying the graphite sheet obtained after ultrasonication. In some embodiments, the graphite sheet is separated via centrifugation and further dried at a temperature of from about 60 to about 100° C., for example about 60 to about 95° C., from about 60 to about 90° C. or about 60° C. in an oven.

The nanocomposite obtained by method 90 comprises, as determined by Scanning Electron Microscopy, δ-$MnO_2$ nanorods which are decorated with MgO nanoparticles. Said nanoparticles have a median volume particle size which is significantly smaller than that of the nanorods such that a multiplicity of the nanoparticles may be disposed on the surface of the nanorods. In some embodiments, the nanoparticles of magnesium oxide are disposed homogeneously on the surface of the δ-$MnO_2$ nanorods. The δ-$MnO_2$ nanorods are themselves supported on graphite sheets (graphite flexes, GF) in the nanocomposite.

A method of hydrogen generation using the nanocomposite catalyst is described. The method includes hydrolyzing sodium borohydride ($NaBH_4$) with water in the presence of the above described nanocomposite catalyst at a temperature of from about 20 to about 75° C., for example from about 25 to about 70° C., from about 30 to about 60° C., from about 35 to about 50° C., or about 40° C. In some embodiments, the ratio by weight of sodium borohydride to the nanocomposite catalyst in the hydrolysis reaction is from about 1:1 to about 3:1, for example from about 1.5:1 to about 2.5:1 or from about 2:1 to about 2:1.

The present method does not preclude one or more further borohydride salts being present in the catalyzed hydrolysis reaction in addition to sodium borohydride. Mention in this regard may be made of lithium borohydride, potassium borohydride, calcium borohydride, magnesium borohydride, aluminum borohydride, zinc borohydride, barium borohydride, cesium borohydride, rubidium borohydride, strontium borohydride, tetrabutylammonium borohydride, ammonium borohydride, trimethylammonium borohydride, benzyltrimethylammonium borohydride, potassium tetraphenylborate, lithium tetrafluoroborate, potassium tetrafluoroborate, sodium tetrafluoroborate, copper borohydride, nickel borohydride, iron borohydride, lead borohydride, copper (II) borohydride, thallium borohydride, gold borohydride, silver borohydride, rhodium borohydride, palladium borohydride andantimony borohydride.

In embodiments of the hydrolysis method, the $NaBH_4$, in solid form, is mixed with the nanocomposite in solid form to provide a solid composition that is stable and storable at room temperature: there may be no decomposition to form hydrogen when the solid mixture of the $NaBH_4$ and the nanocomposite is stored under anhydrous conditions. The stable composition is later used as a source of hydrogen via the addition of water thereto. In alternate embodiments, the $NaBH_4$, in solid form and the nano composite are mixed immediately prior to contact with water.

It is preferred in the hydrolysis reaction that the median volume particle size (Dv50) of the nanocomposite catalyst is substantially less than the median volume particle size (Dv50) of the $NaBH_4$. The $NaBH_4$ may, for example, have a median volume particle size (Dv50) that is at least 5 or even at least 10 times the median volume particle size of the nanocomposite. Differences in the particle size between the two solids provide a means by which the rate of formation of hydrogen gas is buffered. For example, the rate of hydrogen gas formation achieved by adding liquid water to a mixture of particles of $NaBH_4$ and particles of the nanocomposite having essentially the same particle size may be from 2 to 6 times the rate of hydrogen formation provided by adding water to a mixture of particles of the $NaBH_4$ and the nano composite in which the $NaBH_4$ particles have an average particle size that is at least five times, preferably at least 10 times the particle size of the nanocomposite.

The hydrogen gas evolved as a hydrolysis product should be captured. This is often accomplished via gas collection equipment, such as inverted jars or specialized balloons, which allow the gas to gather securely. As the hydrogen forms, it is directed into these containers to keep it from escaping. Safety precautions are crucial since hydrogen is highly flammable. Once captured, hydrogen may be refined and stored for use in a variety of applications, including fuel cells and energy generation, making it an important resource for sustainable energy solutions.

In some embodiments, the nanocomposite catalyst provides an $H_2$ generation rate (HGR) in the hydrolysis reaction of from about 100 to about 2000 mL $min^{-1}$ $g^{-1}$, for example from about 500 to about 2000 mL $min^{-1}$ $g^{-1}$, based on the weight of the $NaBH_4$. In exemplary embodiment, the $H_2$ generation rate values achieved in the presence of 0.5 g of said nanocomposite catalyst and either 0.3 gram (g), 0.5 g, 0.7 g or 1.0 g of $NaBH_4$ are, respectively 467 mL $min^{-1}$ $g^{-1}$, 784 mL $min^{-1}$ $g^{-1}$, 1100 mL $min^{-1}$ $g^{-1}$ and 1430 mL $min^{-1}$ $g^{-1}$. In specific embodiments, wherein 0.5 g of said nanocomposite catalyst is employed, 0.7 g of $NaBH_4$, produces 150 milliliters per minute per gram (mL $min^{-1}g^{-1}$), 610 mL $min^{-1}g^{-1}$, 1100 mL $min^{-1}g^{-1}$, and 1380 mL $min^{-1}g^{-1}$ of $H_2$ gas at temperatures of 28° C., 35° C., 40° C., and 45° C., respectively.

EXAMPLES

The following examples demonstrate a method for producing hydrogen gas using a nanocomposite catalyst. The examples are provided solely for illustration and are not to be construed as limitations of the present disclosure, as many variations thereof are possible without departing from the spirit and scope of the present disclosure.

Example 1: Fabricating magnesium oxide (MgO) nanoparticles (NPs) decorated-manganese (IV) oxide ($MnO_2$) nanorods/graphite sheets (MgO—$MnO_2$@ graphite sheet) nanocomposite Synthesis of $MnO_2$ nanorods: The $MnO_2$ nanorods were synthesized using a sol-gel technique. $MnO_2$ was created by the redox reaction between glycerol and potassium permanganate ($KMnO_4$) in an aqueous solution. After vigorously swirling 200 milliliters (mL) of 0.3 M $KMnO_4$ aqueous solution for 20 minutes at room temperature (25° C.), 400 mL of 0.4 M aqueous glycerol solution was added dropwise to create a gel-type precursor. The obtained gel was stored for 24 hours. The extra potassium ($K^+$) ions were removed by centrifuging multiple times (3000 rpm, 10 minutes) and the residual solid material was thoroughly cleaned with deionized (DI) water. The solid material was dried at 80° C.

in a hot-air electric oven to get a blackish-brown color. Synthesis of MgO nanoparticles (NPs): The MgO NPs were prepared by using magnesium nitrate hexahydrate (Mg(NO$_3$)$_2$·6H$_2$O) as a precursor and sodium hydroxide (NaOH) as a precipitating agent via a sol-gel method. 200 mL of 0.2 M NaOH was dropwise added to 250 mL of 0.1 M magnesium hexahydrate (Mg(NO$_3$)$_2$·6H$_2$O) aqueous solution under constant unidirectional stirring. The solution was heated to a temperature of 60° C. for an hour under continuous stirring, and a white precipitate of magnesium hydroxide was formed. The precipitate was washed several times with double-distilled water and separated via centrifugation at 3000 rpm. The obtained precipitate was dried overnight at 80° C. and finally heated in atmospheric air for 3 hours at 400° C. The obtained nanoparticles were subsequently collected . . . [See: P. Pandiaraj, A. Gnanavelbabu, P. Saravanan, *Experimental and Statistical Analysis of MgO Nanofluids for Thermal Enhancement in a Novel Flat Plate Heat Pipes, International Journal of Nanoscience*, Vol. 17, No. 01-02, 1760018 (2018), the disclosure of which is incorporated herein by reference in its entirety].

Synthesis of MgO NPs decorated MnO$_2$ nanorods/graphite sheets: MgO NPs decorated MnO$_2$ nanorods/graphite sheets were prepared by using 0.1 grams (g) of MgO NPs and 4 g of graphite sheets (graphite flexes, GF). MgO NPs and GF were mixed in a 250 ml beaker with 250 ml hydrochloric acid (HCl) solution at room temperature under magnetic stirring. Further, 1 g of MnO$_2$ was mixed with the above mixture. The mixture was ultrasonically radiated for about 30 minutes to ensure the decoration process and filtered using filter paper. The residue left after the filtration was dried in an oven at 60° C. to evaporate the moisture and form the dry nanocomposite.

Figure 2:
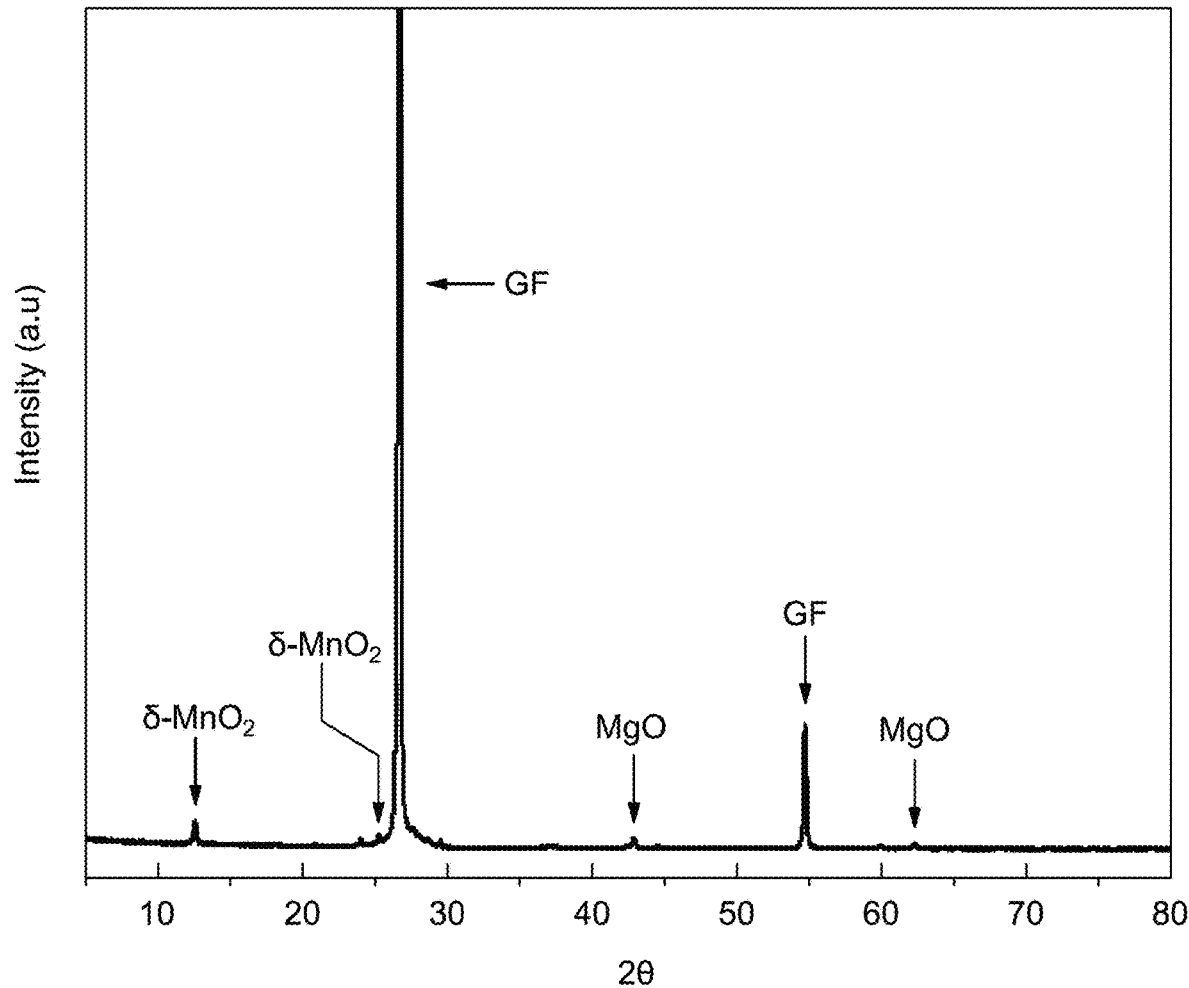
FIG. 2 shows an X-ray diffractogram (XRD) of the nanocomposite catalyst, according to certain embodiments.

An X-ray diffraction (XRD) diffractogram of the prepared nanocomposite is shown in FIG. 2. The diffraction peaks at 2θ=42.8° and 62.2° were assigned to the cubic phase of MgO (International Centre for Diffraction Data (ICDD) entry JCPDS No. 45-0946, the disclosure of which is incorporated herein by reference in its entirety). In addition, three diffraction peaks of (001), (002), and (111) crystalline planes were assigned to as δ-MnO$_2$ (International Centre for Diffraction Data (ICDD) entry JCPDS 80-1098, the disclosure of which is incorporated by reference herein in its entirety). Finally, highly intensive XRD peaks at 2θ=26.5° and 54.5° were assigned to the (002) and (004) of graphite planes, respectively.

Figure 3A:
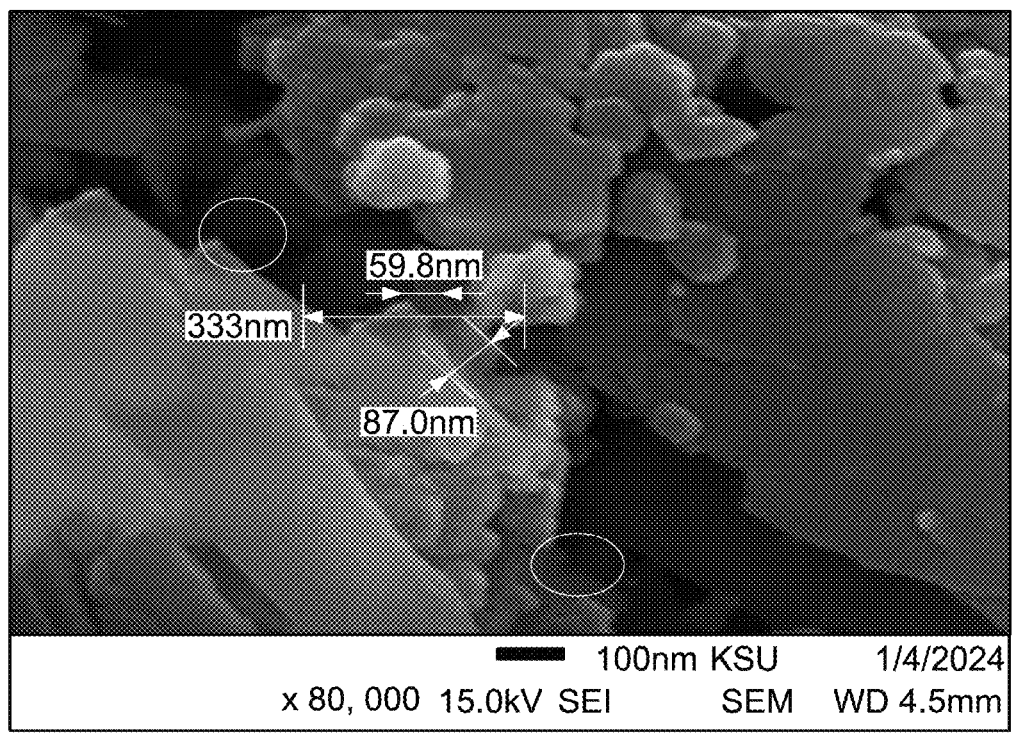
FIG. 3A is an Scanning Electron Microscopy (SEM) image of a nanocomposite catalyst (MgO—$MnO_2$@graphite sheets (graphite flexes, GF)) at a resolution of 100 nm, according to certain embodiments.
Figure 3B:
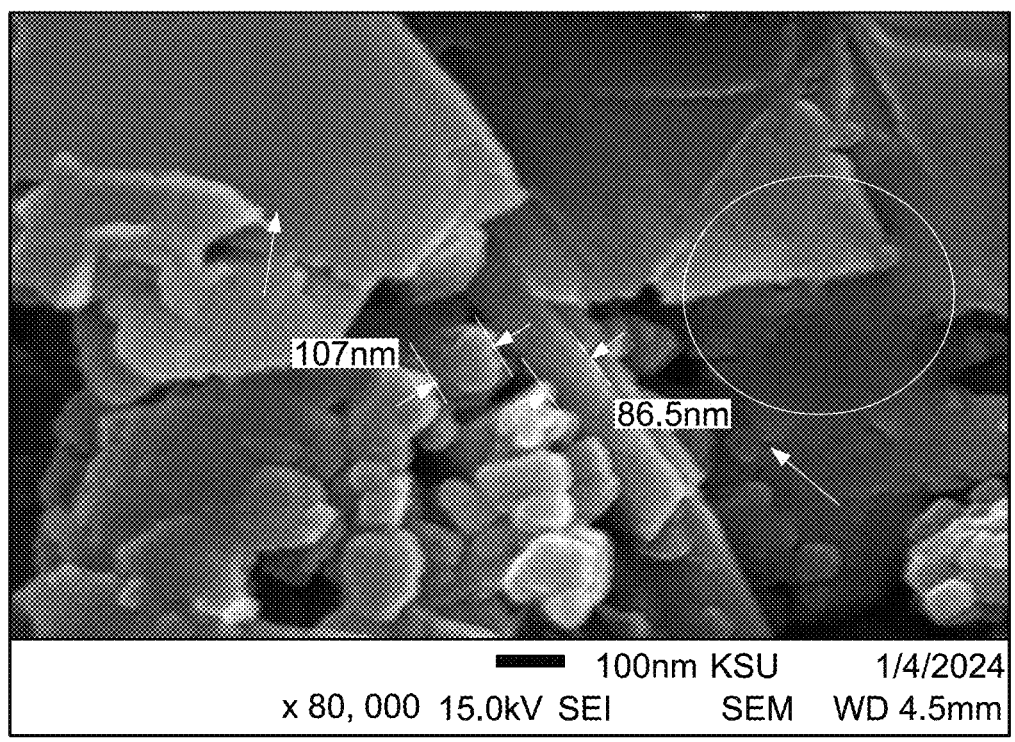
FIG. 3B is a Scanning Electron Microscopy (SEM) image of a catalyst (MgO—$MnO_2$@graphite sheets (graphite flexes, GF)) at a resolution of 100 nm, according to certain embodiments.

The Scanning Electron Microscopy images of the synthesized nanocomposite catalysts depicted in FIGS. 3A and 3B show well-dispersed nanoparticulate structures corresponding to MgO nanoparticles and MnO$_2$ nano-rods. The MgO nanoparticles appear predominantly as irregular, spherical aggregates, with particle sizes ranging from 60 to 107 nm. The MnO$_2$ nanoparticles, with rod-like morphology, are discernible on the surface of the graphite flakes and have observed particle sizes of from 87 to 333 nm. Furthermore, a heterogenous distribution of pores of varying diameter is evident within the graphite flakes (flexes) which may present a porous architecture favorable for catalytic application.

Figure 3C:
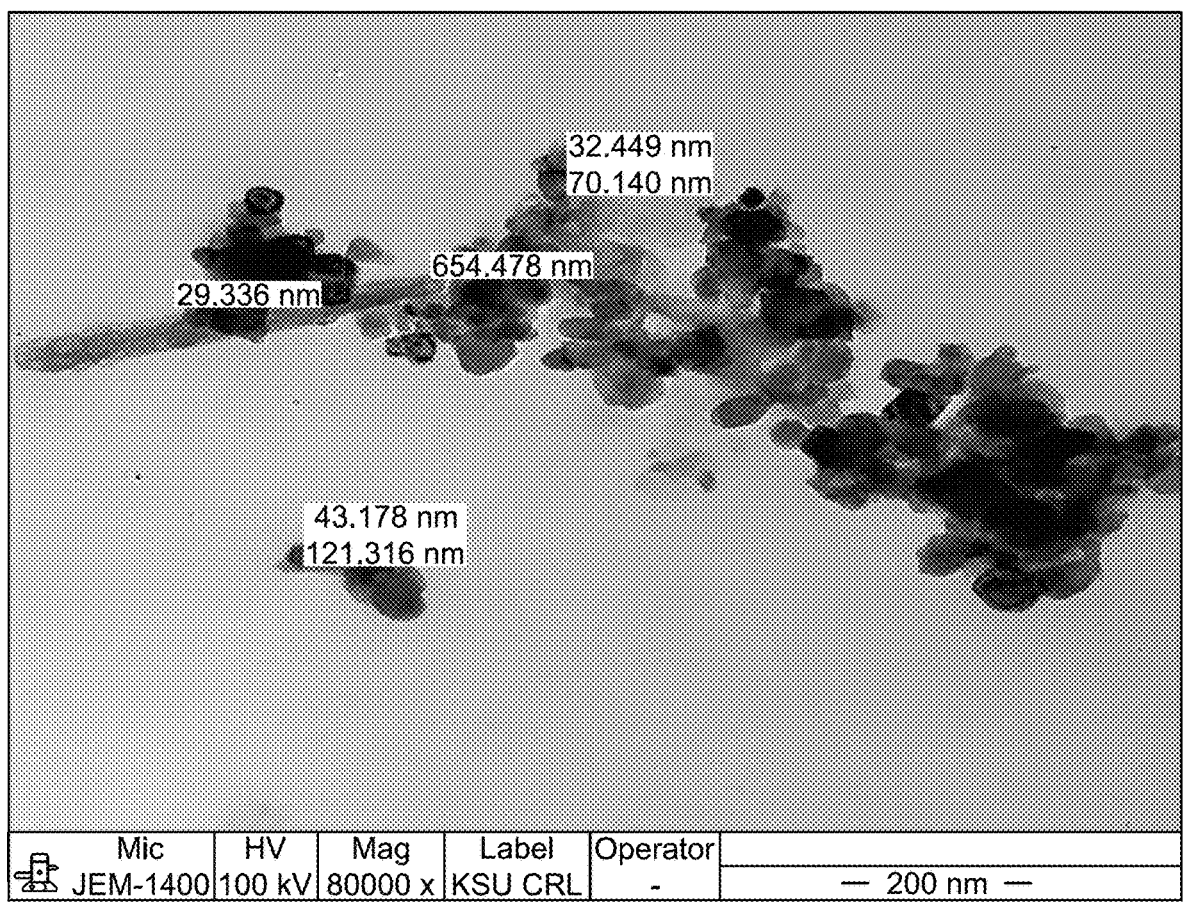
FIG. 3C is a Transmission Electron Microscopy (TEM) image of a catalyst (MgO—$MnO_2$@graphite sheets (graphite flexes, GF)) at a resolution of 200 nm, according to certain embodiments.
Figure 3D:
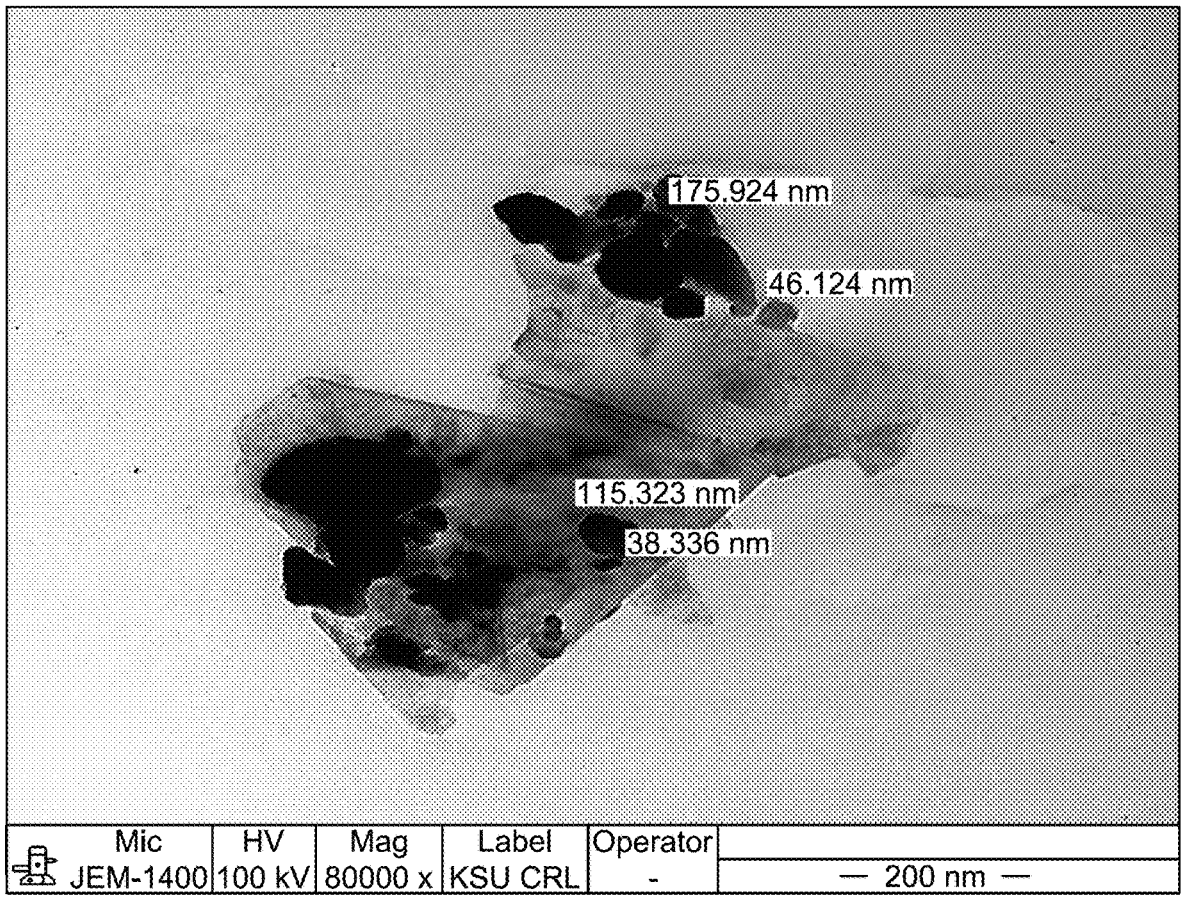
FIG. 3D is a Transmission Electron Microscopy (TEM) image of a catalyst (MgO—$MnO_2$@graphite sheets (graphite flexes, GF)) at a resolution of 200 nm, according to certain embodiments.

The Transmission Electron Microscopy (TEM) images of the synthesized nanocomposite catalysts depicted in FIGS. 3C and 3D confirm the presence of magnesium oxide nanoparticles (MgO NPs) and manganese dioxide nano-rods (MnO$_2$), with the observed MgO NPs having an irregular spherical morphology and a particle size of from 26 to 70 nm; the observed MnO$_2$ nano-rods have a particle size of from 70 to 655 nm. A fraction of the MgO nanoparticles are assembled on the graphite surface, suggesting possible surface modification or functionalization of graphite with these nanoparticles [O. Taurian et al. *Self-consistent electronic structures of MgO and SrO, Solid State Communications* (1985) 55:351-355, the disclosure of which is incorporated herein by reference in its entirety]. There further appears to be some observed integration of the magnesium oxide nanoparticles into the pores of the graphite flakes (flexes).

Figure 4A:
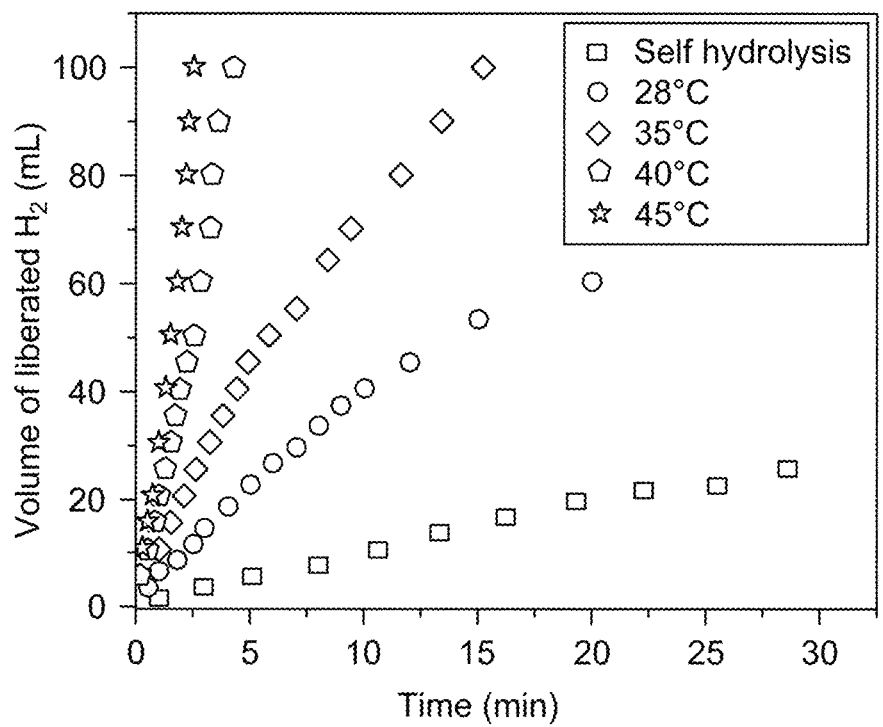
FIG. 4A is a graph depicting the volume of liberated hydrogen gas ($H_2$) versus the reaction time at different reaction temperatures for the nanocomposite catalyst, according to certain embodiments.
Figure 4B:
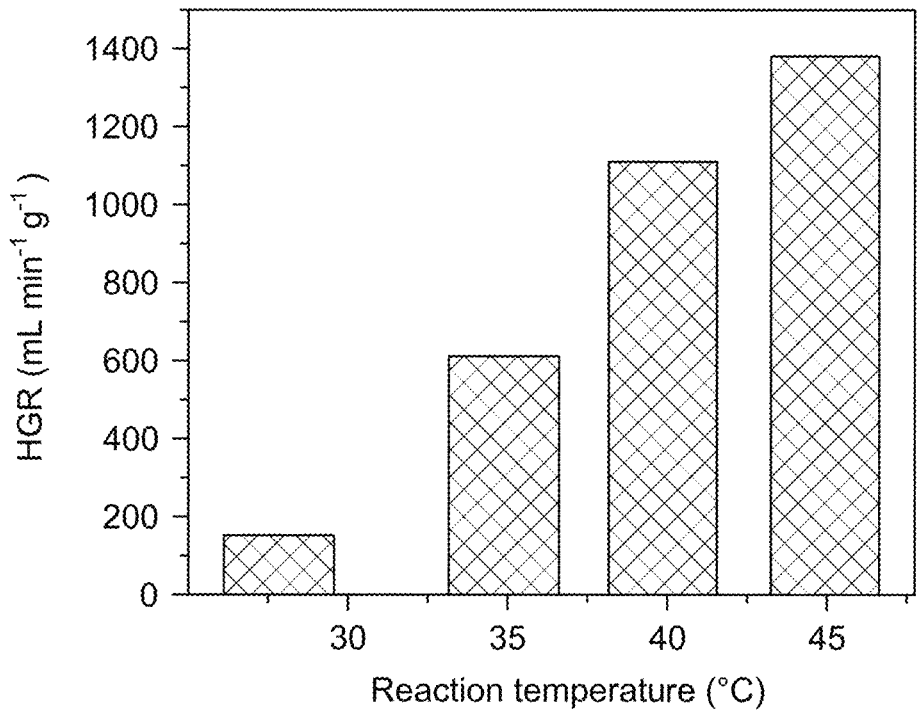
FIG. 4B is a bar graph showing the effect of reaction temperature on hydrogen generation rate (HGR) with 0.7 grams (g) of sodium borohydride ($NaBH_4$) versus 0.5 g of the nanocomposite catalyst, according to certain embodiments.

The results of hydrolysis of sodium borohydride (NaBH$_4$) with and without the MgO—MnO$_2$@GF catalyst are shown in FIGS. 4A-4B. Where applicable, a variable weight of NaBH$_4$, in solid form, is admixed with a fixed weight of nanocomposite (0.5 g) are mixed immediately prior to contact with water.

Figure 5A:
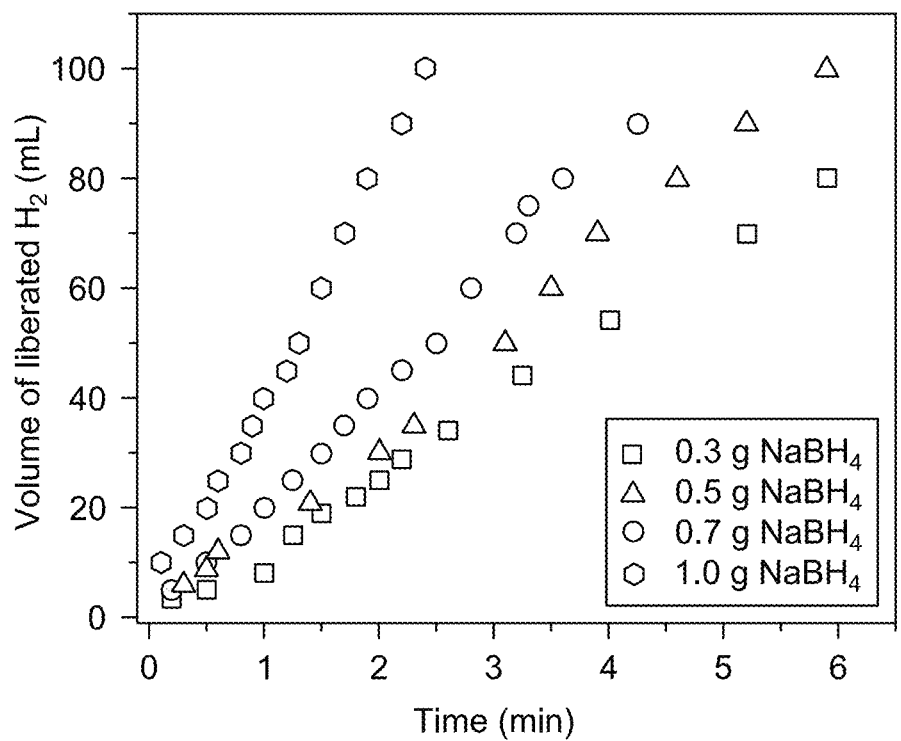
FIG. 5A is a graph showing the effect of reaction time with different weight ratios of $NaBH_4$ to the nanocomposite catalyst and the volume of liberated $H_2$, according to certain embodiments.
Figure 5B:
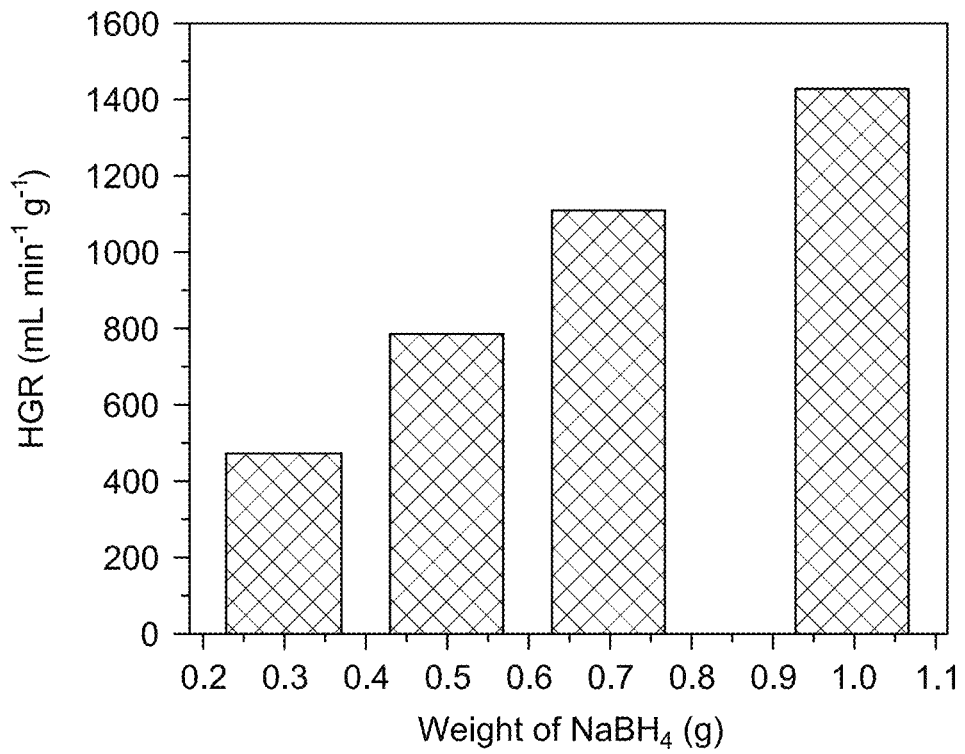
FIG. 5B is a bar graph depicting hydrogen generation rate (HGR) versus the weight of $NaBH_4$ for hydrolysis with water in the presence of the nanocomposite catalyst at a reaction temperature of 40° C., according to certain embodiments.

The catalytic action of the MgO—MnO$_2$@GF catalyst exhibited higher catalytic activity in the catalytic reaction compared to the self-hydrolysis process (FIG. 4A). According to the data analysis, hydrogen gas volume rises gradually over time. The catalytic hydrolysis reaction increases with an increase in reaction temperature. The values of hydrogen generation rate (HGR) of 150 milliliters per minute per gram (mL min$^{-1}$ g$^{-1}$), 610 mL min$^{-1}$ g$^{-1}$, 1100 mL min$^{-1}$ g$^{-1}$, and 1380 mL min$^{-1}$ g$^{-1}$ were obtained at reaction temperatures of 28° C., 35° C., 40° C., and 45° C., respectively on using 0.7 g of NaBH$_4$ with 0.5 g of the nanocomposite catalyst (FIG. 4B). The obtained results indicate that the HGR increases with increasing the weight of NaBH$_4$ at a reaction temperature of 40° C. (FIG. 5A). When utilizing 0.5 g of the nanocomposite catalyst, HGR values of 467 mL min$^{-1}$ g$^{-1}$, 784 mL min$^{-1}$ g$^{-1}$, 1100 mL min$^{-1}$ g$^{-1}$, and 1430 mL min$^{-1}$ g$^{-1}$ were obtained with weights of NaBH$_4$ of 0.3 g, 0.5 g, 0.7 g, and 1.0 g respectively (FIG. 5B).

The hydrolysis reaction was found to proceed according to a first-order kinetics with an activation energy 98.3 kilojoules per mole (kJ mol$^{-1}$). Finally, on applying the Eyring equation to the catalytic reaction, thermodynamic parameters—in particular change in enthalpy (ΔH$^{\#}$), change in entropy (ΔS$^{\#}$), and change in Gibbs free energy (ΔG$^{\#}$)—were determined. The ΔH$^{\#}$ and ΔS$^{\#}$ were estimated to be 103.4 kJ mol$^{-1}$ and 0.4 KJ mol$^{-1}$K$^{-1}$, respectively. At 28° C., 35° C., 40° C., and 45° C., the ΔG$^{\#}$ values were −17.8 kJ mol$^{-1}$, −19.8 kJ mol$^{-1}$, −21.8 KJ mol$^{-1}$ and −23.9 KJ mol$^{-1}$, respectively. The obtained findings suggest that sodium borohydride hydrolyzes spontaneously and endothermically over MgO—MnO$_2$@GF and that the hydrolysis reaction is entropy driven.

Numerous modifications and variations of the present disclosure are possible in light of the above teachings. It is, therefore, to be understood that within the scope of the appended claims, the invention may be practiced otherwise than as specifically described herein.

The invention claimed is:
1. A method of producing hydrogen gas, comprising:
hydrolyzing sodium borohydride (NaBH$_4$) with water at a temperature of from about 20 to about 75° C. in the presence of a nanocomposite catalyst,
wherein the ratio by weight of sodium borohydride to the nanocomposite catalyst is from about 1:1 to about 5:1, and,
wherein the nanocomposite catalyst comprises:
graphite sheet particles on which are disposed:
nanorods of δ-MnO$_2$; and,
nanoparticles of MgO.
2. The method according to claim 1, wherein the nanocomposite catalyst comprises:
from about 50 to about 90 wt. % of the graphite sheet particles;

from about 5 to about 20 wt. % of the nanorods of δ-$MnO_2$; and, from about 0.5 to about 5 wt. % of the nanoparticles of MgO, wherein wt. % is based on the total weight of the nanocomposite catalyst.

3. The method according to claim 1, wherein the nanocomposite catalyst comprises, based on the total weight of the nanocomposite catalyst:

from about 70 to about 90 wt. % of the graphite sheet particles;

from about 5 to about 15 wt. % of the nanorods of δ-$MnO_2$; and, from about 1 to about 3 wt. % of the nanoparticles of MgO.

4. The method according to claim 1, wherein the ratio by weight of δ-$MnO_2$ to MgO in the nanocomposite catalyst is from about 20:1 to about 5:1.

5. The method according to claim 1, wherein the ratio by weight of δ-$MnO_2$ to MgO in the nanocomposite catalyst is from about 12:1 to about 8:1.

6. The method according to claim 1, wherein the MgO has a cubic crystalline phase.

7. The method of claim 1, further comprising:
preparing the nanocomposite catalyst by:
ultrasonicating an acidified aqueous dispersion of δ-$MnO_2$ nanorods and MgO nanoparticles, wherein a graphite sheet has been at least partially immersed in the acidified aqueous dispersion; and,
separating and drying the graphite sheet obtained after the ultrasonicating.

8. The method according to claim 7, wherein the acidified aqueous dispersion comprises a mineral acid selected from the group consisting of: sulphuric acid ($H_2SO_4$); hydrochloric acid (HCl); nitric acid ($HNO_3$); and, phosphoric acid ($H_3PO_4$).

9. The method according to claim 7, wherein the acidified aqueous dispersion comprises hydrochloric acid (HCl).

10. The method according to claim 7, wherein the δ-$MnO_2$ nanorods are obtained by:
adding a polyol reductant to an aqueous solution of an Mn(VII) salt to form a gelled precipitate of $MnO_2$;
separating the gelled precipitate by centrifugation to form a separated precipitate; and,
drying the separated precipitate at a temperature of from about 60 to about 100° C.

11. The method according to claim 10, wherein the polyol reductant consists of glycerol.

12. The method according to claim 10, wherein the Mn(VII) salt is selected from the group consisting of: sodium permanganate ($NaMnO_4$): potassium permanganate ($KMnO_4$); and, ammonium permanganate (($NH_4$) $MnO_4$).

13. The method according to claim 12, wherein the Mn(VII) salt is potassium permanganate.

14. The method according to claim 7, wherein the MgO nanoparticles are obtained by:
adding an alkali metal hydroxide to an aqueous solution of a magnesium salt to form a precipitate of magnesium hydroxide:
separating the precipitate by centrifugation to form a separated precipitate:
drying the separated precipitate at a temperature of from about 60 to about 100° C. to form a dried precipitate; and,
heating the dried precipitate in air at a temperature of from about 300 to about 600° C.

15. The method according to claim 1, wherein the ratio by weight of sodium borohydride to the nanocomposite catalyst is from about 1:1 to about 3:1.

16. The method according to claim 1, wherein sodium borohydride is hydrolyzed with water at a temperature of from about 30 to about 75° C.

17. The method according to claim 1, wherein sodium borohydride is hydrolyzed with water at a temperature of from about 35 to about 60° C.

18. The method according to claim 1, having a hydrogen generation rate of from about 100 to about 2000 mL $min^{-1}$ $g^{-1}$ based on the weight of the sodium borohydride ($NaBH_4$).

19. The method according to claim 1, having a hydrogen generation rate of from about 500 to about 2000 mL $min^{-1}$ $g^{-1}$ based on the weight of the sodium borohydride ($NaBH_4$).

* * * * *